(12) United States Patent
Toshima

(10) Patent No.: US 8,059,339 B2
(45) Date of Patent: *Nov. 15, 2011

(54) LIGHT DIFFUSING SHEET WITH BINDER OF MIXED ACRYLIC AND STYRENE-ACRYLIC RESINS

(75) Inventor: Yasumaro Toshima, Saitama (JP)

(73) Assignee: Kimoto Co., Ltd., Tokyo (JP)

( * ) Notice: Subject to any disclaimer, the term of this patent is extended or adjusted under 35 U.S.C. 154(b) by 695 days.

This patent is subject to a terminal disclaimer.

(21) Appl. No.: 12/087,340

(22) PCT Filed: Jan. 5, 2007

(86) PCT No.: PCT/JP2007/050017
§ 371 (c)(1),
(2), (4) Date: Jul. 2, 2008

(87) PCT Pub. No.: WO2007/086245
PCT Pub. Date: Feb. 8, 2007

(65) Prior Publication Data
US 2009/0009872 A1    Jan. 8, 2009

(30) Foreign Application Priority Data
Jan. 24, 2006    (JP) .................................. 2006-014807

(51) Int. Cl.
G02B 5/02    (2006.01)

(52) U.S. Cl. .......................... 359/599; 428/327; 362/355
(58) Field of Classification Search .................... None
See application file for complete search history.

(56) References Cited

U.S. PATENT DOCUMENTS

| | | | | |
|---|---|---|---|---|
| 5,991,080 | A * | 11/1999 | Kohta et al. | 359/584 |
| 6,288,172 | B1 * | 9/2001 | Goetz et al. | 525/200 |
| 6,908,670 | B1 * | 6/2005 | Maekawa | 428/327 |
| 7,072,115 | B2 * | 7/2006 | Uekita et al. | 359/599 |
| 2002/0001055 | A1 | 1/2002 | Kimura et al. | 349/112 |
| 2009/0067190 | A1 * | 3/2009 | Funabashi et al. | 362/558 |
| 2010/0247866 | A1 * | 9/2010 | Nakahata et al. | 428/156 |
| 2010/0265739 | A1 * | 10/2010 | Funabashi et al. | 362/618 |
| 2011/0007494 | A1 * | 1/2011 | Takai | 362/97.1 |

FOREIGN PATENT DOCUMENTS

| | | |
|---|---|---|
| JP | 08-075909 | 3/1996 |
| JP | 2002-243921 | 8/2002 |

* cited by examiner

*Primary Examiner* — Arnel C Lavarias
(74) *Attorney, Agent, or Firm* — Bacon & Thomas, PLLC

(57) ABSTRACT

A light diffusing sheet brightens frontal direction illumination and resists curl without requiring a complicated design. This light diffusing sheet includes a support and a light diffusing layer provided on the support. The light diffusing layer is formed from at least acrylic resin particles, a styrene acrylic copolymer resin binder, and an acrylic resin binder having a glass transition temperature of 30° C. or lower. Weight ratio of the styrene acrylic copolymer resin binder to the acrylic resin binder is preferably in the range of 1:4 to 4:1.

20 Claims, 1 Drawing Sheet

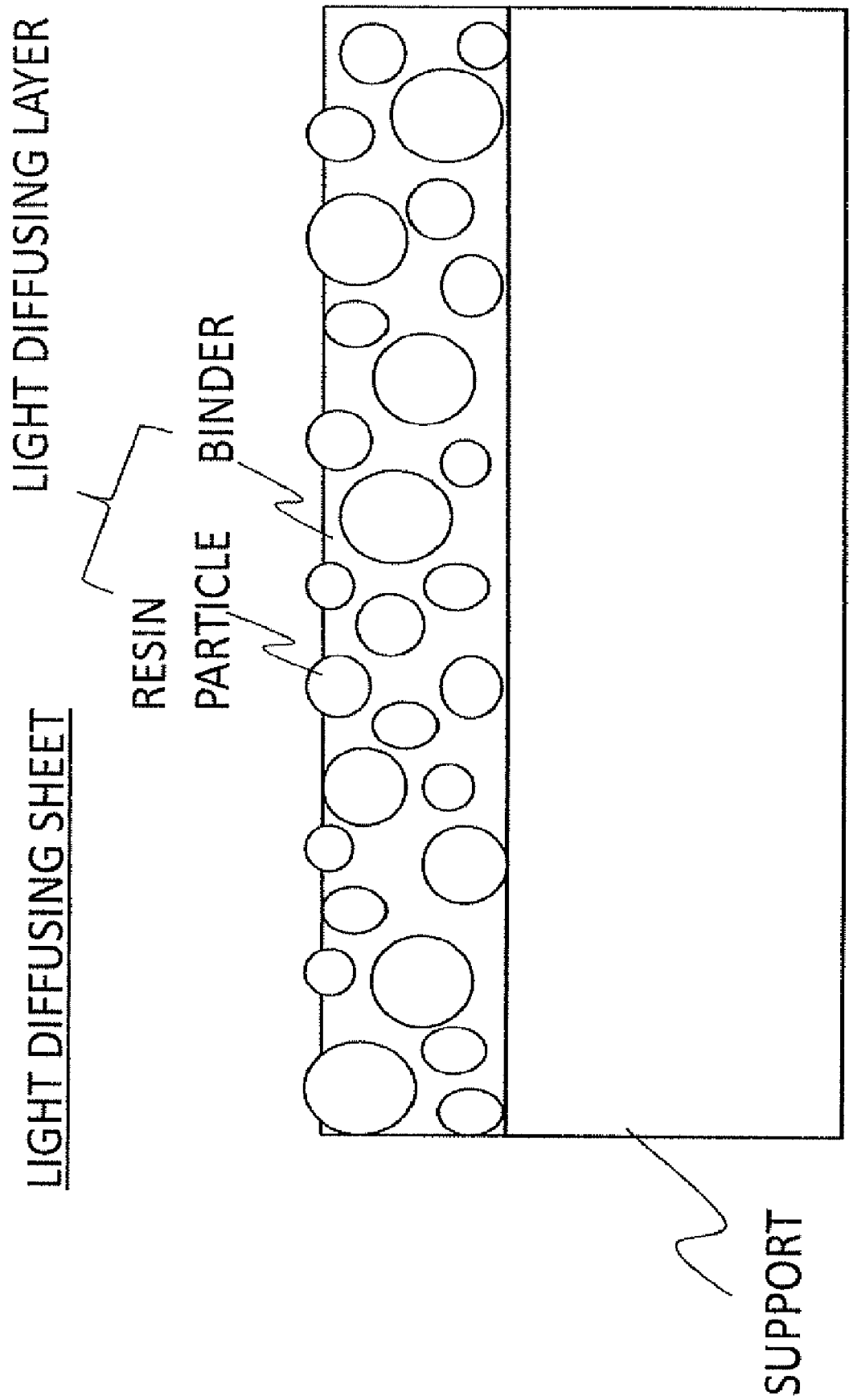

LIGHT DIFFUSING SHEET WITH BINDER OF MIXED ACRYLIC AND STYRENE-ACRYLIC RESINS

TECHNICAL FIELD

The present invention relates to a light diffusing sheet suitably used as a member constituting a backlight unit suitably used for use in a liquid crystal display and so forth.

BACKGROUND ART

In backlight units of liquid crystal displays, light diffusing sheets are used in order to erase light diffusion patterns of light guide plates and increase brightness for the frontal direction. As such light diffusing sheets, light diffusing sheets comprising a support and a light diffusing layer containing a transparent binder resin and plastic beads and provided on one side of the support are generally used.

Higher brightness for the frontal direction is desired especially for liquid crystal displays in recent years, and therefore light diffusing sheets are also desired to have a performance of increasing brightness for the frontal direction.

In order to increase brightness for the frontal direction, it is possible to design surface profiles of light diffusing sheets to be optimal profiles. However, more conveniently, methods of increasing thickness of the light diffusing layer, increasing particle size of plastic beads in the light diffusing layer, increasing content of the plastic beads and so forth are used (Patent document 1).

Patent document 1: Japanese Patent Unexamined Publication (KOKAI) No. 8-75909 (claims)

DISCLOSURE OF THE INVENTION

Object to be Achieved by the Invention

However, the methods of increasing thickness of the light diffusing layer, increasing particle size and content of plastic beads in the light diffusing layer and so forth have a problem that they invite generation of curl to dent surfaces of the light diffusing layer side, although design for those methods is easy. Curl is likely to be generated especially when the support has a small thickness, and poses a serious problem.

Therefore, an object of the present invention is to provide a light diffusing sheet which can provide favorable brightness for the frontal direction without requiring complicated design, in which generation of curl is also prevented.

Means for Achieving the Object

The light diffusing sheet of the present invention, which achieves the aforementioned object, comprises a support and a light diffusing layer provided on the support, and it is characterized in that the light diffusing layer is formed from at least acrylic resin particles, a styrene acrylic copolymer resin binder and an acrylic resin binder having a glass transition temperature of 30° C. or lower.

Weight ratio of the styrene acrylic copolymer resin binder and the acrylic resin binder is preferably in the range of 1:4 to 4:1.

Effect of the Invention

Since the light diffusing layer of the light diffusing sheet of the present invention is constituted from acrylic resin particles, a styrene acrylic copolymer resin binder and an acrylic resin binder having a glass transition temperature of 30° C. or lower, the light diffusing sheet can make brightness for the frontal direction favorable, and can prevent generation of curl.

BRIEF DESCRIPTION OF THE DRAWING

The sole drawing FIGURE is a schematic cross-sectional view of one embodiment of a light diffusing sheet of the present invention.

DESCRIPTION OF THE PREFERRED EMBODIMENTS

Hereafter, embodiments of the light diffusing sheet of the present invention will be explained.

As the support of the light diffusing sheet of the present invention, any support having a light transmitting property may be used without particular limitation. As such a support, for example, transparent plastic films consisting of polyethylene terephthalate, polybutylene terephthalate, polyethylene naphthalate, polycarbonate, polyethylene, polypropylene, polystyrene, triacetyl cellulose, acrylic resin, polyvinyl chloride or the like can be used. Among these, a stretched, especially biaxially stretched, polyethylene terephthalate film is preferred in view of superior mechanical strength and dimensional stability thereof. Moreover, a support of which surface is subjected to a corona discharge treatment or a support provided with an easy adhesion layer on a surface thereof is also preferably used in order to improve adhesion to the light diffusing layer.

The support usually has a thickness of about 20 to 400 μm. In the conventional light diffusing sheets, the lower limit of practically usable thickness is about 50 μm in view of prevention of generation of curl etc. However, according to the present invention, generation of curl can be prevented even with a thin support having a thickness of 50 μm or smaller, although it depends on the composition of the light diffusing layer.

The light diffusing layer of the light diffusing sheet is formed from at least acrylic resin particles, a styrene acrylic copolymer resin binder and an acrylic resin binder having a glass transition temperature of 30° C. or lower. With such a composition of the light diffusing layer, a light diffusing sheet which can provide favorable brightness for the frontal direction and shows favorable anti-curl property can be provided.

The components constituting the light diffusing layer will be explained below.

The acrylic resin particles form convexes and concaves on the surface of the light diffusing layer to generate external haze, and generate internal haze by difference in refractive index from that of the binder resins, and plays a role of providing favorable brightness for the frontal direction and favorable light diffusing property by the actions of these external haze and internal haze.

The acrylic resin particles are not particularly limit so long as they are particles formed from a material containing a resin usually called an acrylic resin. However, true spherical particles of polymethyl methacrylate are preferably used. The acrylic resin of the acrylic resin particles is preferably crosslinked with divinylbenzene or the like from viewpoints of heat resistance, solvent resistance and thermal stability.

The acrylic resin particles usually have a mean particle size of about 5 to 40 μm. Usual light diffusing sheets use a light diffusing agent having a mean particle size of about 10 to 15 μm. However, according to the present invention, generation of curl can be prevented even with large particles having a mean particle size of 15 μm or larger. The mean particle size of the acrylic resin particles is preferably determined in consideration of the thickness of the support and so forth. When the thickness of the support is 50 μm or smaller, the mean particle size is preferably not smaller than 5 μm and not larger than 15 μm, and when the thickness of the support exceeds 50 μm, the mean particle size is preferably not smaller than 15 μm and not larger than 22 μm. By using the acrylic resin particles having a mean particle size in such a range, brightness for the frontal direction and anti-curl property can be favorably balanced.

Further, the acrylic resin particles preferably show a variation coefficient for particle size distribution of 10 to 40%. By using acrylic resin particles showing a variation coefficient for particle size distribution of 10 to 40%, brightness for the frontal direction and light diffusing property can be made favorable. The variation coefficient is a value representing a variance state in particle size distribution, and is a percentage of a value obtained by dividing a standard deviation for particle size distribution (square root of unbiased variance) with an arithmetic average value of particle sizes (mean particle size).

Content of the acrylic resin particles changes depending on mean particle size of the particles or thickness of the light diffusing layer, and it cannot generally be defined. However, it is preferably about 50 to 270 parts by weight with respect to 100 parts by weight of the resin binders. According to the present invention, even when 200 parts by weight or more of the acrylic resin particles are contained with 100 parts by weight of the resin binders, generation of curl can be prevented. Content of the acrylic resin particles is preferably determined in consideration of the thickness of the support and so forth. When the thickness of the support is 50 μm or smaller, the content is preferably not less than 50 parts by weight and not larger than 200 parts by weight with respect to 100 parts by weight of the resin binders, and when the thickness of the support exceeds 50 μm, the content is preferably not less than 200 parts by weight and not larger than 250 parts by weight with respect to 100 parts by weight of the resin binders. By using the acrylic resin particles at a content in such a range, brightness for the frontal direction and anti-curl property can be favorably balanced.

The styrene acrylic copolymer resin binder can be obtained by copolymerizing acrylic type monomers (or acrylic type resin) and styrene type monomers (or styrene type resin). Alternatively, it may be a polymer obtained by graft-polymerizing styrene type monomers on side chains of an acrylic type resin, or graft-polymerizing acrylic type monomers on side chains of a styrene type resin.

Typical examples of the acrylic type monomers include, for example, methacrylate type monomers such as methyl methacrylate and ethyl methacrylate, acrylate type monomers such as methyl acrylate and ethyl acrylate, hydroxyethyl methacrylate, acrylamide, and so forth, and typical examples of the styrene type monomers include styrene, α-methylstyrene, vinyltoluene, and so forth. When these monomers are copolymerized, these monomers as the main components and other monomers may be copolymerized, if needed.

Ratio of the styrene type component and the acrylic type component in the styrene acrylic copolymer resin is preferably 1:4 to 4:1 in terms of weight ratio. By choosing the ratio to be within such a range, brightness for the frontal direction provided by the light diffusing sheet can be made favorable.

The styrene acrylic copolymer resin binder preferably has a glass transition temperature of 40° C. or higher, more preferably a glass transition temperature of 70° C. or higher. By using a resin binder having a glass transition temperature of 40° C. or higher, brightness for the frontal direction and light diffusing property of the light diffusing sheet can be made favorable.

The glass transition temperature can be adjusted by suitably changing the degree of polymerization of the resin, ratio of the acrylic type component and the styrene type component in the resin, and so forth. For example, a homopolymer of styrene has a glass transition temperature of 100° C., and by choosing acrylic type polymers to be copolymerized with styrene, the glass transition temperature can be adjusted. Further, it is known that there are acrylic type monomers having a glass transition temperature of from 0° C. or lower to 100° C. or higher, and the glass transition temperature can be adjusted by appropriately selecting the type of the acrylic type component. For example, a copolymer of styrene (St): methyl methacrylate (MMA):butyl acrylate (BA)=20:55:25 has a glass transition temperature of 46.2° C. (calculated value), but a glass transition temperature of 78.5° C. (calculated value) can be obtained with the same components at a copolymerization ratio of St:MMA:BA=20:70:10.

The acrylic resin binder having a glass transition temperature of 30° C. or lower is added in order to improve anti-curl property of the light diffusing layer. Although styrene acrylic copolymer resin binders can generally improve brightness for the frontal direction, it has a characteristic of making the light diffusing sheet likely to curl. However, if an acrylic resin binder having a glass transition temperature of 30° C. or lower is added, anti-curl property can be made favorable without degrading brightness for the frontal direction improved by the styrene acrylic copolymer resin binder. The acrylic resin binder preferably has a glass transition temperature of 20° C. or lower.

Examples of monomers of the acrylic resin having a glass transition temperature of 30° C. or lower include the same monomers as the aforementioned acrylic type monomers used for the styrene acrylic copolymer resin, and by appropriately changing types of these acrylic type monomers, or by appropriately changing ratios of these acrylic type monomers or the like when two or more kinds of monomers are used, the glass transition temperature can be adjusted to 30° C. or lower. Examples of commercially available acrylic resins having a glass transition temperature of 30° C. or lower include, for example, those marketed by Dainippon Ink & Chemicals Inc. with trade names of ACRYDIC A811 (Tg: 19° C.), ACRYDIC 49-394IM (Tg: 16° C.), ACRYDIC 52-614 (Tg: 16° C.), ACRYDIC 48-261 (Tg: 30° C.), and so forth.

The weight ratio of the styrene acrylic copolymer resin binder and the acrylic resin binder having a glass transition temperature of 30° C. or lower in the light diffusing layer is preferably in the range of 1:4 to 4:1, more preferably in the range of 1:3 to 3:1. By using 4 parts by weight or less of the acrylic resin binder having a glass transition temperature of 30° C. or lower with 1 part by weight of the styrene acrylic copolymer resin binder, brightness for the frontal direction can be made favorable, and by using 1 part by weight or more of the acrylic resin binder having a glass transition temperature of 30° C. or lower with 4 parts by weight of the styrene acrylic copolymer resin binder, anti-curl property can be made favorable.

The light diffusing layer may also contain another resin binder. However, the total ratio of the styrene acrylic copolymer resin binder and the acrylic resin binder having a glass transition temperature of 30° C. or lower is preferably 60% or more, more preferably 70% or more, based on the total resin binders of the light diffusing layer. In such a range, brightness for the frontal direction and anti-curl property of the light diffusing sheet can be made favorable. As the other resin binder, curing agents such as isocyanate type compounds and melamine type compounds, and so forth can be used.

By adding a curing agent in a range not exceeding 40%, performances including adhesion to the support, strength of coated film, solvent resistance and so forth can be improved.

Although thickness of the light diffusing layer is not particularly limited, it is usually 8 to 50 μm, and it is preferably determined in consideration of the thickness of the support and so forth. Specifically, when the thickness of the support is 50 μm or smaller, the thickness of the light diffusing layer is preferably not smaller than 8 μm and not larger than 20 μm, and when the thickness of the support exceeds 50 μm, the thickness of the light diffusing layer is preferably not smaller than 20 μm and not larger than 35 μm. By using the light diffusing layer having a thickness in such a range, favorable balance of brightness for the frontal direction and anti-curl property can be obtained. According to the present invention, even when a light diffusing layer having a thickness of 20 μm or larger is used, generation of curl can be prevented.

The light diffusing sheet preferably has a haze (JIS K7136: 2000) of 85% or more, more preferably 90 to 99%, and a total light transmission (JIS K7361-1:1997) of 90% or more, more preferably 95% or more. With a haze and a total light transmission within such ranges, favorable brightness for the frontal direction and favorable light diffusing property can be obtained.

The light diffusing layer may contain surfactants such as leveling agents and antifoams, additives such as anti-oxidants and ultraviolet absorbers, and other resins, so long as the performances mentioned above are not degraded.

The light diffusing layer can be formed by applying a coating dispersion prepared by dissolving or dispersing materials constituting that layer such as the resin particles and the resins in a suitable solvent on a support according to a known coating method such as bar coating, and drying it.

The surface of the light diffusing sheet of the present invention opposite to the surface of the light diffusing layer side may be subjected to a fine matting treatment for preventing adhesion with other members in a backlight unit or the like (light guide plate etc.) at the time of incorporation into a backlight unit or the like, or an anti-reflection treatment for improving light transmittance.

Further, a backcoat layer having a thickness of about 5 μm or smaller may be provided on the surface of the support opposite to the surface of the light diffusing layer side. The backcoat layer is provided in order to prevent adhesion with other members such as a light guide plate when the light diffusing sheet of the present invention is incorporated into a backlight unit or the like. Further, by providing a backcoat layer, generation of curl can also be suppressed. However, in the light diffusing sheet of the present invention, generation of curl can be prevented even if the thickness of the backcoat layer is so small as described above, or any backcoat layer is not provided.

The light diffusing sheet of the present invention explained above is used mainly as one part of a backlight unit constituting a light source of a liquid crystal display, illumination signboard, scanner or copying machine.

Examples of the configuration of backlight unit include those of the so-called edge light type and direct type. A backlight unit of the edge light type comprises, for example, a light guide plate having a light source at least at one end of the panel and a surface substantially perpendicular to the end as a light projection surface and an optical member disposed on the light projection surface of the light guide plate. A backlight unit of the direct type comprises a light source, a light diffusing material disposed on one side of the light source, and an optical member disposed on the side of the light diffusing material opposite to the light source side. The light diffusing sheet of the present invention can be used as an optical member of such an edge light type or direct type backlight unit. In addition, a prism sheet and so forth may also be used in combination as an optical member.

Although direction of the light diffusing layer in a backlight unit is not limited, the light diffusing sheet is preferably disposed so that the light diffusing layer should be on the light projection side.

EXAMPLES

Hereafter, the present invention will be further explained with reference to examples. The term and symbol "part" and "%" are used on weight basis, unless especially indicated.

Example 1

On a base material consisting of a polyester film having a thickness of 50 μm (Lumirror T60, Toray Industries, Inc.), a coating dispersion (a) for light diffusing layer having the following composition was applied by bar coating so as to obtain a dry thickness of 10 μm, and dried to form a light diffusing layer and thereby obtain a light diffusing sheet of Example 1.

| <Coating dispersion (a) for light diffusing layer> | |
|---|---|
| Styrene acrylic copolymer resin (ACRYDIC A-817, Dainippon Ink & Chemicals, Inc., solid content: 50%, glass transition temperature: 96° C., content of styrene type component: 35%) | 82 parts |
| Acrylic resin having glass transition temperature of 30° C. or lower (ACRYDIC A-811, Dainippon Ink & Chemicals, Inc., solid content: 50%, glass transition temperature: 19° C.) | 82 parts |
| Isocyanate type curing agent (Takenate D110N, Mitsui Takeda Chemicals, Inc., solid content: 60%) | 30 parts |
| Acrylic resin particles (polymethyl methacrylate true spherical particles, mean particle size: 8 μm, variation coefficient: 37%) | 160 parts |
| Butyl acetate | 350 parts |
| Methyl ethyl ketone | 150 parts |

Example 2

A light diffusing sheet of Example 2 was obtained in the same manner as that of Example 1 except that the amounts of the styrene acrylic copolymer resin, the acrylic resin having a glass transition temperature of 30° C. or lower and the isocyanate type curing agent in the coating dispersion (a) for light diffusing layer of Example 1 were changed to 120 parts, 40 parts and 34 parts, respectively.

Example 3

A light diffusing sheet of Example 3 was obtained in the same manner as that of Example 1 except that the amounts of the styrene acrylic copolymer resin, the acrylic resin having a glass transition temperature of 30° C. or lower and the isocyanate type curing agent in the coating dispersion (a) for light diffusing layer of Example 1 were changed to 42 parts, 126 parts and 27 parts, respectively.

Example 4

A light diffusing sheet of Example 4 was obtained in the same manner as that of Example 1 except that the amounts of the styrene acrylic copolymer resin, the acrylic resin having a glass transition temperature of 30° C. or lower and the isocyanate type curing agent in the coating dispersion (a) for light diffusing layer of Example 1 were changed to 132 parts, 26.4 parts and 35 parts, respectively.

Example 5

A light diffusing sheet of Example 5 was obtained in the same manner as that of Example 1 except that the amounts of the styrene acrylic copolymer resin, the acrylic resin having a glass transition temperature of 30° C. or lower and the isocyanate type curing agent in the coating dispersion (a) for light diffusing layer of Example 1 were changed to 28 parts, 140 parts and 26 parts, respectively.

Example 6

A light diffusing sheet of Example 6 was obtained in the same manner as that of Example 1 except that the polyester film of Example 1 was changed to a polyester film having a thickness of 188 μm, the acrylic resin particles in the coating dispersion (a) for light diffusing layer of Example 1 were changed to other acrylic resin particles (polymethyl methacrylate true spherical particles, mean particle size: 18 μm, variation coefficient: 22%, amount: 220 parts by weight), and the thickness of the light diffusing layer was changed to 25 μm.

Example 7

A light diffusing sheet of Example 7 was obtained in the same manner as that of Example 1 except that the polyester film of Example 1 was changed to a polyester film having a thickness of 25 μm, and the acrylic resin particles in the coating dispersion (a) for light diffusing layer of Example 1 were changed to other acrylic resin particles (polymethyl methacrylate true spherical particles, mean particle size: 8 μm, variation coefficient: 18%).

Comparative Example 1

A light diffusing sheet of Comparative Example 1 was obtained in the same manner as that of Example 1 except that, in the coating dispersion (a) for light diffusing layer of Example 1, the acrylic resin having a glass transition temperature of 30° C. or lower was not added, and the amounts of the styrene acrylic copolymer resin and the isocyanate type curing agent were changed to 156 parts and 37 parts, respectively.

Comparative Example 2

A light diffusing sheet of Comparative Example 2 was obtained in the same manner as that of Example 1 except that, in the coating dispersion (a) for light diffusing layer of Example 1, the styrene acrylic copolymer resin was not added, and the amounts of the acrylic resin having a glass transition temperature of 30° C. or lower and the isocyanate type curing agent were changed to 172 parts and 23 parts, respectively.

Comparative Example 3

A light diffusing sheet of Comparative Example 3 was obtained in the same manner as that of Comparative Example 2 except that the acrylic resin particles in the coating dispersion (a) for light diffusing layer of Comparative Example 2 were changed to other acrylic resin particles (polymethyl methacrylate true spherical particles, mean particle size: 18 μm, variation coefficient: 22%, amount: 220 parts), and the thickness of the light diffusing layer was changed to 25 μm.

Comparative Example 4

A light diffusing sheet of Comparative Example 4 was obtained in the same manner as that of Example 6 except that, in the coating dispersion (a) for light diffusing layer of Example 6, the acrylic resin having a glass transition temperature of 30° C. or lower was not added, and the amounts of the styrene acrylic copolymer resin and the isocyanate type curing agent were changed to 156 parts and 37 parts, respectively.

Comparative Example 5

A light diffusing sheet of Comparative Example 5 was obtained in the same manner as that of Example 6 except that, in the coating dispersion (a) for light diffusing layer of Example 6, the styrene acrylic copolymer resin was not added, and the amounts of the acrylic resin having a glass transition temperature of 30° C. or lower and the isocyanate type curing agent were changed to 172 parts and 23 parts, respectively.

The light diffusing sheets obtained in Examples 1 to 7 and Comparative Examples 1 to 5 were evaluated for the following items. The results are shown in Table 1. The compositions and thicknesses of the light diffusing layers and the thicknesses of the supports in the light diffusing sheets are summarized in Table 2. In Table 2, "Styrene acrylic" means the styrene acrylic copolymer resins, "Acrylic" means the acrylic resins, and the numerals (parts) indicate parts by weight of solid content, in which numerical values below decimal points are raised to unit or omitted.

(1) Anti-Curl Property

Curl of the light diffusing sheets was evaluated by visual inspection. The results are indicated with the following symbols: "◯": no curl was observed, "Δ": slight curl with dent on the light diffusing layer side, and "X": significant curl with dent on the light diffusing layer side.

(2) Brightness for the Frontal Direction/Edge Light Type Backlight Unit

The light diffusing sheets of Examples 1 to 7 and Comparative Examples 1 to 5 were each built into a 15-inch edge light type backlight unit (1 inch=2.54 cm) comprising one cold cathode tube each on the up side and down side, and brightness for the frontal direction was measured. Specifically, each light diffusing sheet was installed on a light guide plate so that the surface of the light diffusing sheet on the light diffusing layer side should serve as a light projection surface, a prism sheet (BEF II, Sumitomo 3M Limited) was further installed on the light diffusing sheet, and brightness for the frontal direction was measured at the center of the backlight unit (unit is "cd/m$^2$").

(3) Brightness for the Frontal Direction/Direct Type Backlight Unit

The light diffusing sheets of Examples 1 to 7 and Comparative Examples 1 to 5 were each built into a 27-inch direct type backlight unit (1 inch=2.54 cm) comprising 12 cold cathode tubes, and brightness for the frontal direction was measured. Specifically, each light diffusing sheet was installed on a light diffusing material (translucent resin plate) so that the surface of the light diffusing sheet on the light diffusing layer side should serve as a light projection surface, a prism sheet (RBEF, Sumitomo 3M Limited) was further installed on the light diffusing sheet, and brightness for the frontal direction was measured at the center of the backlight unit (unit is "cd/m²").

TABLE 1

|  | Anti-curl property | Brightness for frontal direction (cd/m²) | |
|---|---|---|---|
|  |  | Edge light type | Direct type |
| Example 1 | ○ | 2730 | 8900 |
| Example 2 | ○ | 2740 | 8950 |
| Example 3 | ○ | 2720 | 8850 |
| Example 4 | Δ | 2740 | 8950 |
| Example 5 | ○ | 2660 | 8850 |
| Example 6 | ○ | 2800 | 9100 |
| Example 7 | ○ | 2770 | 9030 |
| Comparable Example 1 | X | 2740 | 8950 |
| Comparable Example 2 | ○ | 2600 | 8500 |
| Comparable Example 3 | X | 2660 | 8750 |
| Comparable Example 4 | X | 2800 | 9100 |
| Comparable Example 5 | ○ | 2660 | 8750 |

TABLE 2

|  | Styrene-acrylic (part) | Acrylic (part) | Curing agent (part) | Amount of particles (part) | Thickness of light diffusing layer (μm) | Thickness of support (μm) |
|---|---|---|---|---|---|---|
| Example 1 | 41 | 41 | 18 | 160 | 10 | 50 |
| Example 2 | 60 | 20 | 20 | " | " | " |
| Example 3 | 21 | 63 | 16 | " | " | " |
| Example 4 | 66 | 13 | 21 | " | " | " |
| Example 5 | 14 | 70 | 16 | " | " | " |
| Example 6 | 41 | 41 | 18 | 220 | 25 | 188 |
| Example 7 | 41 | 41 | 18 | 160 | 10 | 25 |
| Comparable Example 1 | 78 | — | 22 | 160 | 10 | 50 |
| Comparable Example 2 | — | 86 | 14 | " | " | " |
| Comparable Example 3 | — | 86 | 14 | 220 | 25 | " |
| Comparable Example 4 | 78 | — | 22 | " | " | 188 |
| Comparable Example 5 | — | 86 | 14 | " | " | " |

The light diffusing sheets of Examples 1 to 7 showed no curl, or ignorable curl, if any. Even though the light diffusing sheets of Examples 1 to 5 had a small thickness of the support as thin as 50 μm, especially the light diffusing sheet of Example 7 had a small thickness of the support as thin as 25 μm, generation of curl could be prevented in them. Even though the light diffusing sheet of Example 6 contained acrylic resin particles having a large particle size in a large amount in the light diffusing layer, generation of curl could be prevented in it.

Moreover, although the light diffusing sheets of Examples 1 to 5 and 7 used the same configurations of the light diffusing layers (mean particle size of the acrylic resin particles, amount of the acrylic resin particles, thickness of the light diffusing layer, etc.) as those of the light diffusing sheets of Comparative Examples 1 and 2 except for the composition of the resin binders, they showed brightness for the frontal direction higher than that observed with the light diffusing sheets of Comparative Examples 1 and 2, and moreover, they had anti-curl property. Similarly, although the light diffusing sheet of Example 6 used the same configurations of the light diffusing layer as those of the light diffusing sheets of Comparative Examples 3 to 5 except for the resin binders, it showed brightness for the frontal direction higher than that observed with the light diffusing sheets of Comparative Examples 3 to 5, and it also had anti-curl property. These results indicate that the light diffusing sheets of Examples 1 to 7 containing three kinds of the materials, the acrylic resin particles, the styrene acrylic copolymer resin binder and the acrylic resin binder having a glass transition temperature of 30° C. or lower, in the light diffusing layers can provide more favorable brightness for the frontal direction compared with the light diffusing sheets of Comparative Examples 1 to 5, which do not contain those three kinds of materials, and at the same time, they can prevent generation of curl.

The light diffusing sheets of Comparative Examples 1 and 4 corresponded to those of Examples 1 and 6, respectively, in which the acrylic resin binder having a glass transition temperature of 30° C. or lower was excluded from the resin binders, and they showed generation of curl.

The light diffusing sheet of Comparative Example 2 corresponded to that of Example 1 in which the styrene acrylic copolymer resin binder was excluded from the resin binders, and it showed brightness for the frontal direction inferior to that observed with the light diffusing sheet of Example 1.

The light diffusing sheet of Comparative Example 3 corresponded to that of Comparative Example 2 in which the thickness of the light diffusing layer and the particle size of the acrylic resin particles in the light diffusing layer were increased, and the amount of the particles was increased. Although it thereby slightly improved brightness for the frontal direction compared with that observed with the light diffusing sheet of Comparative Example 2, curl was generated in it. Moreover, although it used acrylic resin particles having a larger mean particle size in a larger amount, and a light diffusing layer having a larger thickness, it showed brightness for the frontal direction comparable to or inferior to that observed with the light diffusing sheets of Examples 1 to 5 and 7, which used acrylic resin particles having a smaller mean particle size in a smaller amount, and a light diffusing layer having a smaller thickness compared with the light diffusing sheet of Comparative Example 3.

The light diffusing sheet of Comparative Example 5 corresponded to the light diffusing sheet of Example 6 in which the styrene acrylic copolymer resin binder was excluded form the resin binders, and it showed brightness for the frontal direction inferior to that observed with the light diffusing sheet of Example 6. Moreover, although it used acrylic resin particles having a larger mean particle size in a larger amount, and a light diffusing layer having a larger thickness, it showed brightness for the frontal direction comparable to or inferior to that observed with the light diffusing sheets of Examples 1 to 5 and 7, which used acrylic resin particles having a smaller mean particle size in a smaller amount, and a light diffusing layer having a smaller thickness compared with the light diffusing sheet of Comparative Example 5.

The invention claimed is:

1. A light diffusing sheet comprising a support and a light diffusing layer provided on the support, wherein:
   the light diffusing layer comprises at least acrylic resin particles and a mixed resin binder, the mixed resin binder comprising a styrene acrylic copolymer resin binder, and an acrylic resin binder having a glass transition temperature of from 0° C. to 30° C.

2. The light diffusing sheet according to claim 1, wherein:
   weight ratio of the styrene acrylic copolymer resin binder to the acrylic resin binder is in the range of 1:4 to 4:1.

3. The light diffusing sheet according to claim 1, wherein:
the styrene acrylic copolymer resin binder has a glass transition temperature of 40° C. or higher.

4. The light diffusing sheet according to claim 1, wherein:
the support has a thickness of 50 μm or smaller, and the acrylic resin particles have a mean particle size not smaller than 5 μm and not larger than 15 μm.

5. The light diffusing sheet according to claim 4, wherein:
the support has a thickness of 50 μm or smaller, and content of the acrylic resin particles is not less than 50 parts by weight and not more than 200 parts by weight based on 100 parts by weight of the mixed resin binder contained in the light diffusing layer.

6. The light diffusing sheet according to claim 5, wherein:
the light diffusing layer has a thickness not smaller than 8 μm and not larger than 20 μm.

7. The light diffusing sheet according to claim 1, wherein:
the support has a thickness larger than 50 μm and not larger than 400 μm, and the acrylic resin particles have a mean particle size not smaller than 15 μm and not larger than 22 μm.

8. The light diffusing sheet according to claim 1, wherein:
the support has a thickness larger than 50 μm and not larger than 400 μm, and content of the acrylic resin particles is not less than 200 parts by weight and not more than 250 parts by weight based on 100 parts by weight of the mixed resin binder contained in the light diffusing layer.

9. The light diffusing sheet according to claim 8, wherein:
the light diffusing layer has a thickness not smaller than 20 μm and not larger than 35 μm.

10. The light diffusing sheet according to claim 2, wherein:
the styrene acrylic copolymer resin binder has a glass transition temperature of 40° C. or higher.

11. The light diffusing sheet according to claim 10, wherein:
the support has a thickness of 50 μm or smaller, and the acrylic resin particles have a mean particle size not smaller than 5 μm and not larger than 15 μm.

12. The light diffusing sheet according to claim 2, wherein:
the support has a thickness of 50 μm or smaller, and the acrylic resin particles have a mean particle size not smaller than 5 μm and not larger than 15 μm.

13. The light diffusing sheet according to claim 3, wherein:
the support has a thickness of 50 μm or smaller, and the acrylic resin particles have a mean particle size not smaller than 5 μm and not larger than 15 μm.

14. The light diffusing sheet according to claim 1, wherein:
the support has a thickness of 50 μm or smaller, and content of the acrylic resin particles is not less than 50 parts by weight and not more than 200 parts by weight based on 100 parts by weight of the mixed resin binder contained in the light diffusing layer.

15. The light diffusing sheet according to claim 2, wherein:
the support has a thickness of 50 μm or smaller, and content of the acrylic resin particles is not less than 50 parts by weight and not more than 200 parts by weight based on 100 parts by weight of the mixed resin binder contained in the light diffusing layer.

16. The light diffusing sheet according to claim 3, wherein:
the support has a thickness of 50 μm or smaller, and content of the acrylic resin particles is not less than 50 parts by weight and not more than 200 parts by weight based on 100 parts by weight of the mixed resin binder contained in the light diffusing layer.

17. The light diffusing sheet according to claim 4, wherein:
the light diffusing layer has a thickness not smaller than 8 μm and not larger than 20 μm.

18. The light diffusing sheet according to claim 2, wherein:
the support has a thickness larger than 50 μm and not larger than 400 μm, and the acrylic resin particles have a mean particle size not smaller than 15 μm and not larger than 22 μm.

19. The light diffusing sheet according to claim 3, wherein:
the support has a thickness larger than 50 μm and not larger than 400 μm, and the acrylic resin particles have a mean particle size not smaller than 15 μm and not larger than 22 μm.

20. The light diffusing sheet according to claim 7, wherein:
the light diffusing layer has a thickness not smaller than 20 μm and not larger than 35 μm.

\* \* \* \* \*